(12) United States Patent  
Kim et al.

(10) Patent No.: US 7,372,519 B2  
(45) Date of Patent: May 13, 2008

(54) LIQUID CRYSTAL DISPLAY DEVICE AND METHOD OF MANUFACTURING THEREOF

(75) Inventors: Jin Ho Kim, Eunpyeong-gu (KR); Sung Yoon Paik, Seocho-Gu (KR); Moon Soo Kang, Seo-gu (KR)

(73) Assignee: LG.Philips LCD Co., Ltd., Seoul (KR)

( * ) Notice: Subject to any disclaimer, the term of this patent is extended or adjusted under 35 U.S.C. 154(b) by 343 days.

(21) Appl. No.: 11/153,608

(22) Filed: Jun. 16, 2005

(65) Prior Publication Data

US 2005/0280751 A1    Dec. 22, 2005

(30) Foreign Application Priority Data

Jun. 18, 2004  (KR) ............... 10-2004-0045285  
May 24, 2005  (KR) ............... 10-2005-0043698

(51) Int. Cl.  
*G02F 1/1333*  (2006.01)

(52) U.S. Cl. .................................. 349/60; 349/65

(58) Field of Classification Search ............ 349/58, 349/60–68  
See application file for complete search history.

(56) References Cited

U.S. PATENT DOCUMENTS

| 5,182,660 | A | * | 1/1993 | Tanaka | 349/65 |
| 5,815,224 | A | * | 9/1998 | Hasegawa et al. | 349/58 |
| 6,388,722 | B1 | * | 5/2002 | Yoshii et al. | 349/62 |
| 6,573,956 | B1 | * | 6/2003 | Shibata | 349/65 |
| 2001/0010569 | A1 | * | 8/2001 | Jin et al. | 349/58 |

* cited by examiner

*Primary Examiner*—Toan Ton  
*Assistant Examiner*—John Heyman  
(74) *Attorney, Agent, or Firm*—Birch, Stewart, Kolasch & Birch, LLP

(57) ABSTRACT

A liquid crystal display device is provided. The liquid crystal display device includes: a liquid crystal display panel having an upper substrate and a lower substrate, a backlight assembly; a top cover surrounding the liquid crystal display panel, and a pad located on an upper surface of the lower substrate. The pad distributes a force applied by the top cover to the lower substrate, thereby reducing light leakage of the backlight assembly.

21 Claims, 5 Drawing Sheets

LIQUID CRYSTAL DISPLAY DEVICE AND METHOD OF MANUFACTURING THEREOF

This Nonprovisional application claims priority under 35 U.S.C. §119(a) on Patent Application No. 10-2004-0045285 filed in Korea on Jun. 18, 2004 and Patent Application No. 10-2005-0043698 filed in Korea on May 24, 2005, the entire contents of which are hereby incorporated by reference.

BACKGROUND OF THE INVENTION

1. Field of the Invention

The present invention relates to a liquid crystal display device, by which light leakage is reduced by distributing a force applied to a liquid crystal display panel by a top cover.

2. Discussion of the Related Art

Generally, a liquid crystal display (LCD) as one of various flat panel type displays has visibility better than that of a cathode ray tube (CRT). The LCD also has lower power consumption and a lower exothermic quantity than those of the CRT having the same screen size. Therefore, the LCD has recently been identified as a next generation display device for a mobile phone, computer monitor and television.

Such an LCD has an operational principle of displaying an image via the liquid crystal substance, which is an intermediate substance between liquid and solid. The liquid crystal substance is injected in between a pair of thin glass panels whose surfaces are specially treated. By varying alignment of liquid crystal molecules with a voltage difference of electrodes between the upper and lower glass panels, the light transmission through the liquid crystal substance will change. Since the panels to display characters thereon are unable to emit light, the LCD needs a light source such as a lamp to make display contents visually recognizable.

Generally, a backlight assembly is provided as a light source to a back side of an LCD module used as a screen display device of a portable computer such as a notebook computer.

FIG. 1 is a perspective view of a module of an LCD according to a related art. FIG. 2 is a cross-sectional view of the module along a bisected line of I-I' in FIG. 1.

Referring to FIGS. 1 and 2, a module 100 of an LCD includes an LCD panel 110 at a front side to display a video, a backlight assembly 120 at a rear side of the LCD panel 110 to provide a light source for the LCD panel 110, a mold frame 117 supporting the backlight assembly 120, a top cover 119 supporting an edge of a front side of the LCD panel 110, and a rectangular frame type bottom cover 118 enclosing a lower surface of the backlight assembly 120 to install the backlight assembly 120 therein and to be assembled to the top cover 119.

The backlight assembly 120 includes a fluorescent lamp 111 at one side of the LCD panel 110, a lamp housing 112 fixing the fluorescent lamp 111 thereto to condense light emitted from the fluorescent lamp 111 into a light-guide plate 113, a light-guide plate 113 converting incident light from the fluorescent lamp 111 to be a plane light source, optic sheets 115 and 116 attached to the light guide plate 113 to raise efficiency of light incident on the LCD panel 110, and a reflective sheet (reflector) 114 attached to a backside of the light-guide plate 113 to reflect light from a rear side of the light-guide plate 113 toward the LCD panel 110.

A receiving space is provided within the mold frame 117. The lamp 111 of the backlight assembly 120 is installed within the mold frame 117 along one side edge of the backlight assembly 120. Since the lamp 111 is electrically operative, wires are connected to both end portions of the lamp 111 to supply power from outside.

The backlight assembly 120, including the reflective sheet 114, the light-guide plate 113 and optic sheets 115 and 116, is inserted in the mold frame 117 to be fixed thereto. In addition, the LCD panel 110 is situated over the sheets to display information using the light transferred from the backlight assembly 120.

Coupling recesses are formed at the rear side of the bottom cover 118 opposed to the mold frame 117 to leave a predetermined distance from each other. In addition, the bottom cover 118 is bent to have a 'ㄇ' shape to enclose one lateral side and front side of the mold frame 117. Moreover, the bottom cover 118 is formed of an aluminum (Al) based material.

A predetermined edge area of the top cover 119 is bent to prevent the LCD panel 110 from being separated from the mold frame 117. In addition, the top cover 119 is assembled to the bottom cover 118.

FIG. 3 is a layout of a top view of the LCD according to the related art, in which the LCD panel pressurized by the top cover is shown.

Referring to FIG. 3, the top cover 119 is configured to pressurize an upper panel 104 of the LCD panel 110. A reference "A" of the upper panel indicates an area of the pressurized top cover.

However, if the upper panel having a color filter thereon is pressurized, the pressure is concentrated on one side only. Hence, light leakage takes place in the LCD panel to appear on the LCD panel as a shape of the bright line.

SUMMARY OF THE INVENTION

Accordingly, the present invention is directed to a module of a liquid crystal display device that substantially obviates one or more problems due to limitations and disadvantages of the related art.

An object of the present invention is to provide a liquid crystal display device and a method of manufacturing a liquid crystal display device (LCD), by which light leakage is reduced by distributing a force applied by the top cover to a liquid crystal display panel.

To achieve these objects and other advantages and in accordance with the purpose of the invention, as embodied and broadly described herein, a liquid crystal display device according to the present invention includes: a liquid crystal display panel having upper and lower substrates, the upper and lower substrates having a display region, the lower substrate having a peripheral region; a backlight assembly at a rear side of the liquid crystal display panel; a top cover surrounding edges of lateral and front sides of the liquid crystal display panel; a pad provided between the liquid crystal display panel and the top cover, the pad being located on the peripheral region; and a bottom cover surrounding lateral and lower sides of the backlight assembly.

In another aspect of the present invention, a method of manufacturing a liquid crystal display device includes (a) providing a backlight assembly, (b) placing a liquid crystal display panel on the backlight assembly, the liquid crystal display panel having upper and lower substrates, the lower substrate having a display region and a peripheral region, (c) attaching a pad on the peripheral region of the liquid crystal display, (d) assembling a bottom cover on lateral and lower sides of the backlight assembly, and (e) assembling a top cover on edges of lateral and front sides of the liquid crystal display panel.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
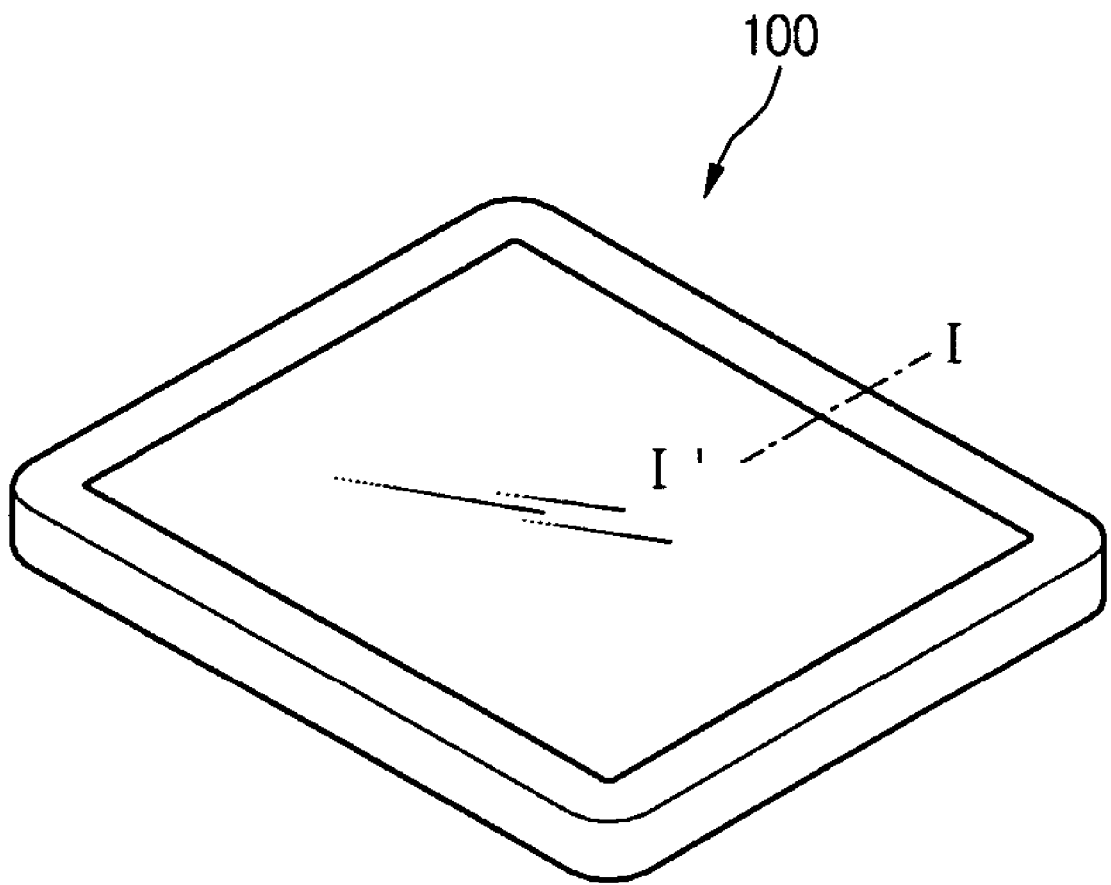
FIG. 1 is a perspective view of a module of an LCD according to the related art.
Figure 2:
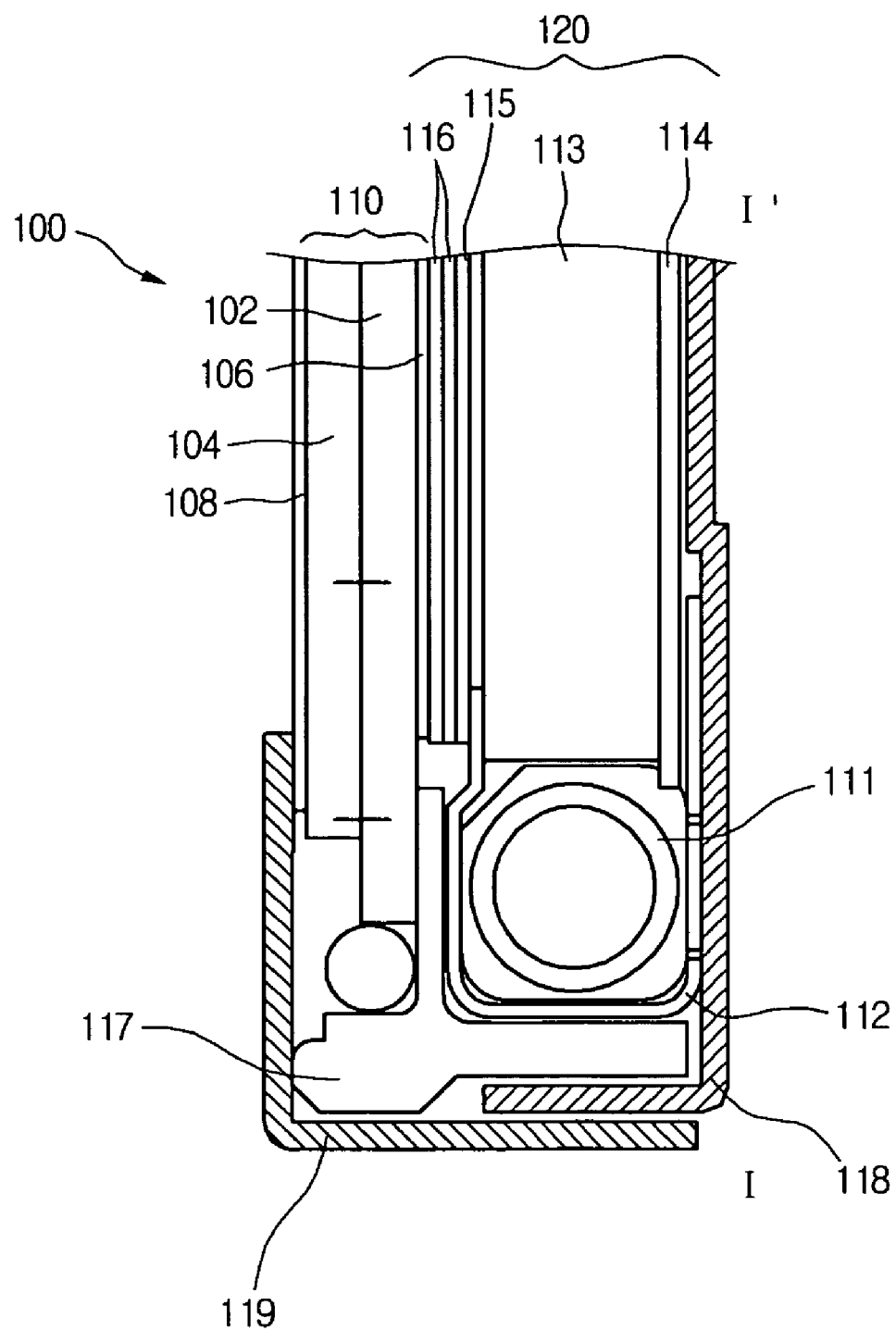
FIG. 2 is a cross-sectional view of the module along a bisected line I-I' in FIG. 1.
Figure 3:
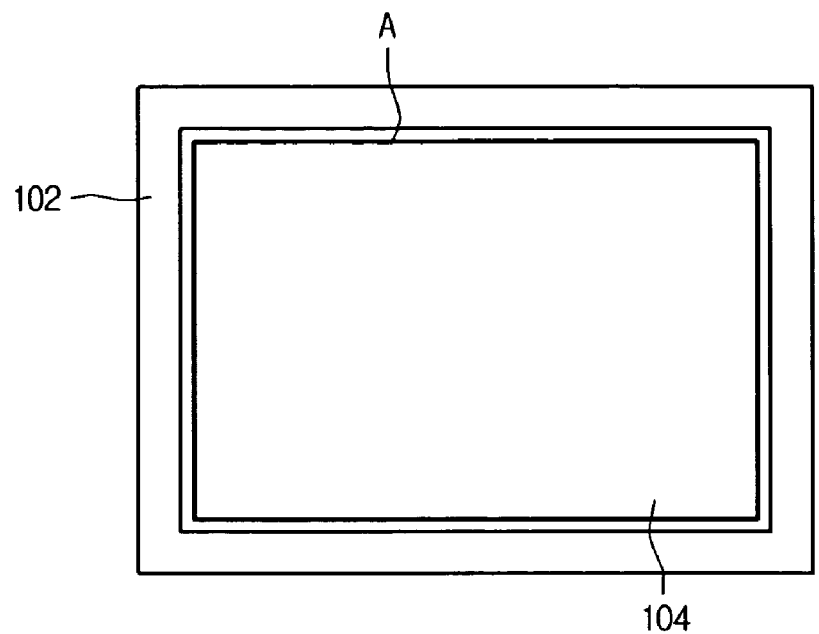
FIG. 3 is a layout of a top view of the LCD according to the related art.
Figure 4:
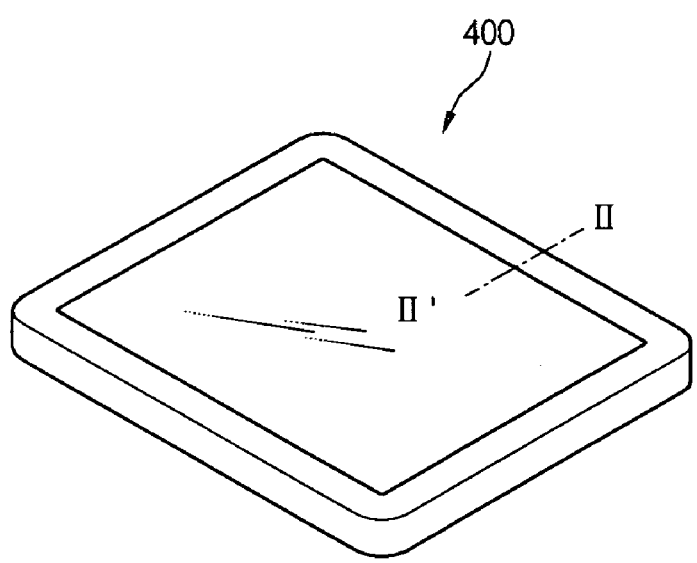
FIG. 4 is a perspective view of a module of an LCD according to an embodiment of the present invention.
Figure 5:
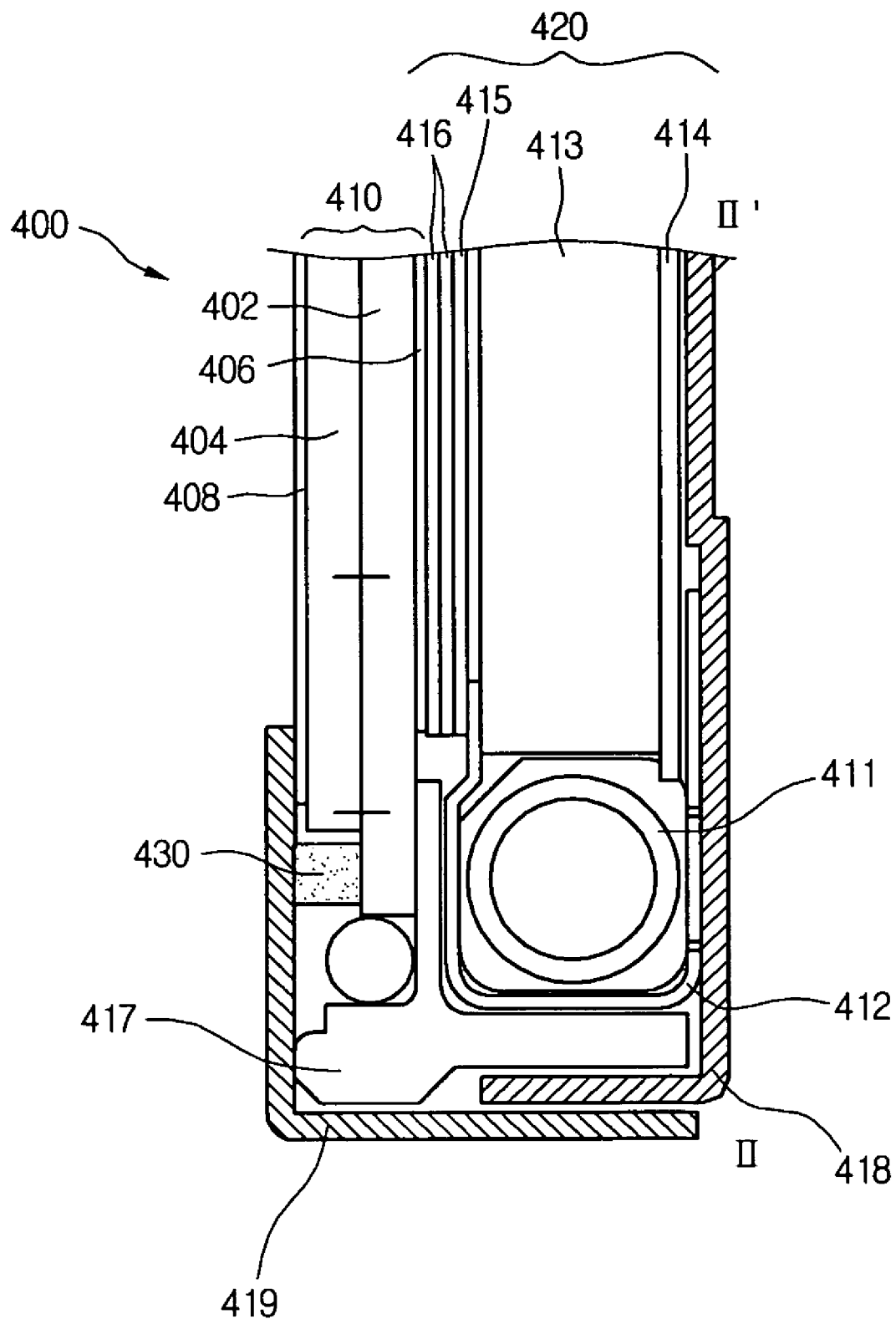
FIG. 5 is a cross-sectional view of the module along a bisected line II-II' in FIG. 4.

Referring to FIGS. 4 and 5, a module 400 of an LCD device includes an LCD panel 410 having upper and lower panels or substrates 404 and 402 arranged to leave a predetermined gap therebetween and a liquid crystal layer filling the gap between the upper and lower panels 404 and 402, a backlight assembly 420 at a rear side of the LCD panel 410 to provide a light source to the LCD panel 410, a top cover 419 enclosing edges of lateral and front sides of the LCD panel 410, a pad 430 located on the LCD panel 410, and a bottom cover 418 enclosing lateral and lower sides of the backlight assembly 420.

The LCD panel 410 includes the lower panel 402 having thin film transistors (TFT) operating as switching devices at intersections between gate and data bus lines, respectively, the upper panel 404 having a color filter layer and a common electrode to confront the lower panel 402, and the liquid crystal layer injected between the lower and upper panels 402 and 404.

The upper panel 404 and the lower panel 402 have a display region corresponding to a color filter layer area or TFT area, and a pad region corresponding to the area of gate and data bus lines edges.

Polarizing plates 406 and 408 are attached to outer surfaces of the lower and upper panels 402 and 404, respectively. In this case, light transmission axes of the polarizing plates 406 and 408 are set orthogonal to each other.

The lower panel 402 of the LCD panel 410 is formed wider than the upper panel 404 so that signal line pads, printed circuit board and drive integrated circuit are mounted on a periphery region of the lower panel 402. The periphery region is on the upper surface of the lower panel 402. In this case, the line pads, printed circuit board and drive integrated circuit are connected to a tape carrier package.

If a voltage is applied to the selected gate bus line and the data bus line of the above-configured LCD panel 410, the TFT to which the voltage is applied is turned on so that electric charges are accumulated on a pixel electrode connected to a drain electrode of the turned-on TFT to change an angle of liquid crystal molecules between the pixel electrode and the common electrode.

Hence, by controlling an electric field applied to the dielectric anisotropic liquid crystal molecules of the liquid crystal layer, the light provided from the backlight assembly 420 is transmitted or cut off to display an image or video.

A pad 430 is provided, which can be located anywhere on the liquid crystal display panel provided that the pad can distribute a force applied by the top cover to the lower panel 402, thereby reducing light leakage of a backlight assembly. In this embodiment, the pad 430 is located between the LCD panel 410 and the top cover 419 to sustain a pressure generated by the top cover 419, thereby distributing a force applied by the top cover 419 to the lower panel 402. In this embodiment, the pad 430 is directly contacted to the top cover 419 and to the peripheral region of the lower panel 402.

In this embodiment, the pad 430 is formed of a plastic based material such as PET (Polyethylene terephthalate) based material.

The pad 430 can be located in the vicinity of the driver-IC region within the peripheral region. The pad 430 can be located at at least two sides of the liquid crystal display panel or can surround the liquid crystal display panel. In addition, the pad 430 can be a single-piece pad or include a plurality of spaced-apart pad segments located on the peripheral region. For example, the spaced-apart pad segments can be located at two sides or four sides of the liquid crystal display panel. The number of the pad segments may vary based on the force applied by the top cover 419.

The backlight assembly 420 includes a lamp 411 at one side of the LCD panel 410 to emit light, a light-guide plate 413 converting incident light from the lamp 411 to be a plane light source, a lamp housing 412 fixing the lamp 411 thereto to have one side overlapped with the bottom cover 418, optic sheets 415 and 416 attached to the light guide plate 413 to raise the efficiency of light incident on the LCD panel 410, and a reflective sheet (reflector) 414 attached to a backside of the light-guide plate 413 to reflect light from a rear side of the light-guide plate 413 toward the LCD panel 410.

The lamp housing 412 encloses upper and lateral sides of the lamp 411. In addition, the reflective sheet 414 is located below the lamp 411. For this, the reflective sheet 414 extends toward the lamp 411 from the light guide plate 413 to contact with one end of the lamp housing 412.

The optic sheets 415 and 416 are a diffusion sheet 415 and a prism sheet 416, respectively. The diffusion sheet 415 is located above the light guide plate 413 to uniformly diffuse the light from the light guide plate 413. The prism sheet 416 is located above the diffusion sheet 415 to condense the light diffused by the diffusion sheet 415 and to transfer the condensed light to the LCD panel 410.

A receiving space is provided within the mold frame 417. The lamp 411 of the backlight assembly 420 is installed within the mold frame 417 along one side edge of the backlight assembly 420. Since the lamp 411 is electrically operative, wires are connected to both end portions of the lamp 411 to supply power from outside.

The backlight assembly 420, including the reflective sheet 414, the light guide plate 413 and optic sheets 415 and 416, is inserted in the mold frame 417 to be fixed thereto. In addition, the LCD panel 410 is located above the sheets to display information using the light transferred from the backlight assembly 420.

The bottom cover 418 is formed of a metal-based material and encloses a backside of the light guide plate 413 of the backlight assembly 420.

A predetermined edge area of the top cover 419 is bent to prevent the LCD panel 410 from being separated from the mold frame 417. In addition, the top cover 419 is assembled to the bottom cover 418.

Figure 6:
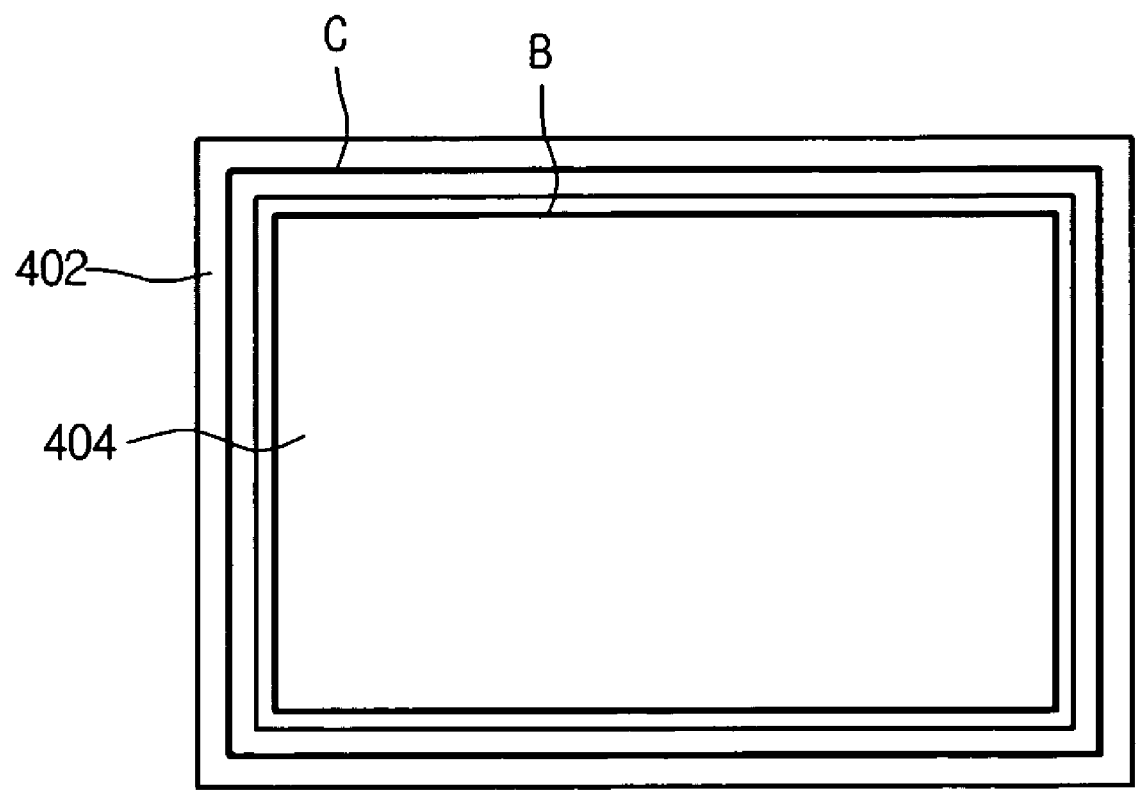
FIG. 6 is a layout of a top view of the LCD according to an embodiment of the present invention.

FIG. 6 is a layout of a top view of the LCD according to an embodiment of the present invention, in which the LCD panel pressurized by the top cover is shown.

Referring to FIG. 6, a portion B of the top cover 419 puts pressure on the upper panel 404 of the LCD panel 410. In addition, a portion C of the lower panel 402 is pressurized by the pad 430, which distributes the force applied by the top cover 419 to the lower panel 402.

In this embodiment, the pad 430 is formed of a PET (Polyethylene terephthalate) based material and is disposed in the vicinity of an area where the drive IC is formed.

Hence, a force of the top cover 419 pressurizing the upper panel 404 of the LCD panel 410 is also distributed to the lower panel 402 through the pad 430.

Namely, the force pressurizing the upper panel 404 is distributed to the lower panel 402 to reduce light leakage due to the pressurization of the upper panel 404.

The method of assembling the liquid crystal display device as stated above will be explained, hereinafter.

First, the mold frame 417, in which a receiving space is provided, is prepared. In addition, the backlight assembly 420 comprising the reflective sheet 414, the light guide plate 413 and the optic sheets 415 and 416 is inserted in the mold frame 417 to be fixed thereto. Subsequently, the liquid crystal display (LCD) panel 10 comprising the lower panel 402, the upper panel 404 and the liquid crystal layer injected between the lower and upper panels is placed on the backlight assembly 420. Then, the pad 430 made of a PET based material is attached onto the peripheral region on the lower panel 402. Then, the lateral and lower sides of backlight assembly 420 are enclosed by the bottom cover 418 which is made of a metal-based material. Finally, the top cover 419 supporting an edge of a front side of the LCD panel 110 is assembled to the bottom cover 418.

In another embodiment, first, the mold frame 417, in which a receiving space is provided, is prepared. In addition, the backlight assembly 420, including the reflective sheet 414, the light guide plate 413 and the optic sheets 415 and 416, is inserted in the mold frame 417 to be fixed thereto. Subsequently, the liquid crystal display (LCD) panel 10 comprising the lower panel 402, the upper panel 404 and the liquid crystal layer injected between the lower and upper panels is placed on the backlight assembly 420. The pad 430 made of a PET based material is attached to the predetermined position of the top cover 419. The predetermined position corresponds to the peripheral region of the lower panel 402 when the top cover 419 is assembled to the mold frame 417. Then, the lateral and lower sides of the backlight assembly 420 are enclosed by the bottom cover 418 which is made of a metal-based material. Finally, the top cover 419 with the pad 430 supporting an edge of a front side of the LCD panel 110 is assembled to the bottom cover 418.

Accordingly, the module of the LCD device according to an embodiment of the present invention distributes the force applied by the top cover to the lower panel of the LCD panel, thereby reducing light leakage.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A liquid crystal display device, comprising:
    a liquid crystal display panel having an upper substrate and a lower substrate;
    a backlight assembly;
    a top cover surrounding the liquid crystal display panel; and
    a pad directly contacting an upper surface of the lower substrate, the pad distributing a force applied by the top cover which pressurizes the upper substrate to the lower substrate, thereby reducing light leakage of the backlight assembly due to the pressurization of the upper substrate,
    wherein the upper surface of the lower substrate has a display region and a periphery region including a driver-IC region and the pad is located in the vicinity of the driver-IC region on the periphery region.

2. The liquid crystal display device of claim 1, wherein the pad is located between the top cover and the periphery region.

3. The liquid crystal display device of claim 2, wherein the pad directly contacts the top cover and the periphery region.

4. The liquid crystal display device of claim 1, wherein the pad is located at at least two sides of the liquid crystal display panel.

5. The liquid crystal display device of claim 1, wherein the pad is a single piece.

6. The liquid crystal display device of claim 1, wherein the pad includes a plurality of spaced-apart segments.

7. The liquid crystal display device of claim 1, wherein the pad is formed of a plastic based material.

8. The liquid crystal display device of claim 7, wherein the plastic based material is a PET based material.

9. The liquid crystal display device of claim 1, wherein the backlight assembly is disposed at a rear side of the liquid crystal display panel, the top cover surrounding edges of lateral and front sides of the liquid crystal display panel, the liquid crystal display device further comprising a bottom cover surrounding lateral and lower sides of the backlight assembly.

10. A method of fabricating a liquid crystal display device, comprising the steps of;
    providing a backlight assembly and a liquid crystal display panel having an upper substrate and a lower substrate;
    disposing a liquid crystal display panel on the backlight assembly;
    disposing a pad directly on a periphery region of an upper surface of the lower substrate, wherein the pad distributes a force applied by the top cover which pressurizes the upper substrate to the lower substrate so as to reduce light leakage of the backlight assembly due to the pressurization of the upper substrate; and
    disposing a top cover on the pad,
    wherein the pad is disposed on the vicinity of a driver-IC region being within the periphery region.

11. The method of claim 10, wherein the step of disposing the top cover includes arranging the top cover, the pad and the lower substrate to locate the pad between the top cover and the lower substrate.

12. The method of claim 10, wherein the step of disposing the top cover includes: directly contacting the top cover to the pad.

13. The method of claim 10, further including disposing the pad at at least two sides of the liquid crystal display panel.

14. The method of claim 10, wherein the step of disposing the pad includes disposing a single-piece pad on the periphery region of the lower substrate.

15. The method of claim 10, wherein the step of disposing the pad includes disposing a plurality of spaced-apart pad segments on the periphery region of the lower substrate.

16. The method of claim 10, further including disposing the top cover on edges of lateral and front sides of the liquid crystal display panel.

17. The method of claim 16, wherein the step of disposing the top cover on the edges of the lateral and the front sides of the liquid crystal display panel includes surrounding the edges of the lateral and the front sides of the liquid crystal display panel.

18. The method of claim 10, further comprising disposing a bottom cover on lateral and lower sides of the backlight assembly.

19. The method of claim 18, wherein the step of disposing the bottom cover on the lateral and the lower sides of the backlight assembly includes surrounding the lateral and the lower sides of the backlight assembly.

20. The liquid crystal display device of claim 1, wherein the pad does not protrude beyond one side end portion of the lower substrate.

21. The method of claim 10, wherein the pad does not protrude beyond one side end portion of the lower substrate.

\* \* \* \* \*